J. MacGregor, Jr.,
Planing Machine,
N° 557.
Patented Jan. 9, 1838.
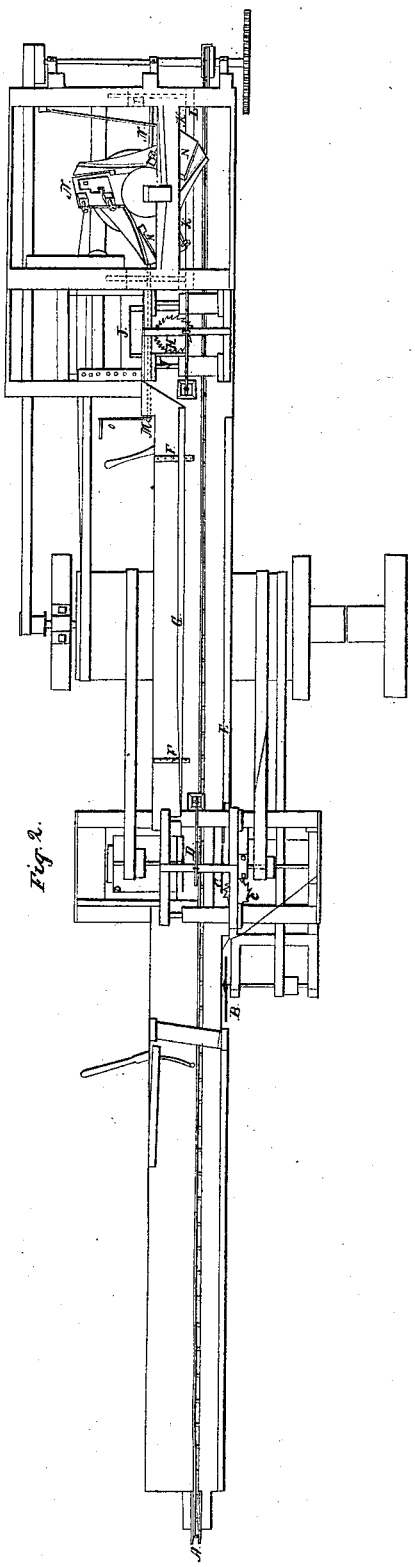
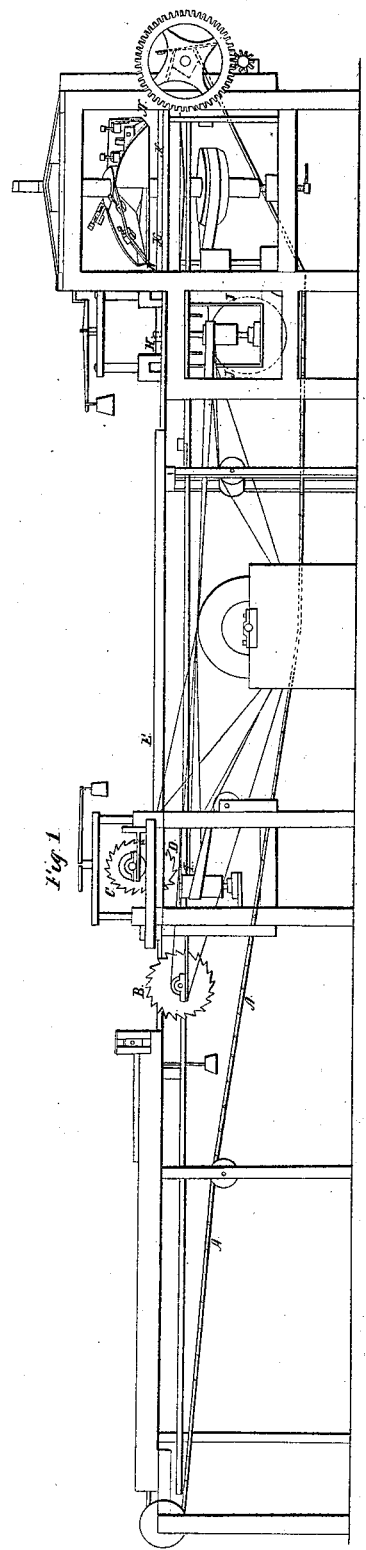

UNITED STATES PATENT OFFICE.

JAMES MacGREGOR, JR., OF WILTON, NEW YORK.

PLANING-MACHINE.

Specification of Letters Patent No. 557, dated January 9, 1838.

*To all whom it may concern:*

Be it known that I, JAMES MACGREGOR, Jr., of Wilton, in the county of Saratoga, in the State of New York, have made certain Improvements in Machines for Plaining, Jointing, Tonguing, and Grooving Boards, for which Letters Patent of the United States were granted unto me under date of the 28th day of August, 1833; and I do hereby declare that the following is a full and exact description of the improvements now made by me and for which I desire to obtain Letters Patent of the United States.

My machine does not vary in its general construction and mode of operation from that above alluded to, and it will not, therefore, be necessary for me to describe it minutely in the present specification, but only to particularize those things which constitute my improvements thereon.

Figure 1 in the accompanying drawing gives a front, and Fig. 2, a top view of the improved machine, and where the same parts are represented they are designated by the same letters of reference in each of the figures.

In my original machine the board, or plank was jointed on both edges by two circular saws set upon shafts nearly opposite to each other, this jointing having been the first operation performed by the machine as the board entered it to be jointed, tongued, and grooved.

In my improved machine, after placing the plank upon the bed of the machine and conveying it forward by means of the endless chain A, A, as formerly, it first comes in contact with the jointing saw B, which joints one edge of it by cutting a strip therefrom, which strip is carried off as heretofore. As it advances the plank next comes into contact with the tonguing saws C, C, which operate upon the jointed edge, while the second jointing saw D, which stands opposite to the tonguing saws C, C, joints the opposite edge. By this arrangement I have removed a difficulty experienced in the old machine in which the plank was jointed at the same time on both edges, by two saws as before noticed, and was subsequently made to encounter the tonguing and grooving saws acting opposite to each other; it however, was found impossible to prevent those slight deviations in the apparatus which would affect the regularity of the tongue and groove and consequently the matching of the plank.

The first improvement which I claim consists in the foregoing new arrangement of the jointing and tonguing saws; namely, in the first jointing of one edge by a circular saw upon the first saw shaft, and the subsequent jointing of the opposite edge while the tonguing of the first jointed, is at the same time effected at a point opposite, or nearly opposite to the second jointing saw, as herein described. The plank as it proceeds forward is borne up against the gage strip E, on the front of the bed, by the movable gages F, F, as formerly, but to carry off the strip cut by the second jointing saw, I have added the guide strip or gage, G, which is armed with a thin elastic plate of iron at that end of it which is toward the kerf it enters, and effectually removes the strip out of the way, and prevents its interfering with the grooving saws H, as it sometimes did under the old arrangement.

The end of the elastic strip of iron is confined on to the frame of this second jointing saw, so that when the saw is shifted the strip moves with it, and is thus always opposite to the left.

My second claim to improvement is to the employment of the gage strip E, in the manner, and for the purpose set forth.

The grooving saws I, are constructed and operate as in the original machine, and are in like manner supported upon a sliding frame J, J, by which they may be adjusted precisely to the width of the stuff to be grooved. The stuff after being tongued and grooved passes on between the stationary gage strip E, and the opposite cheek or strip K, K, which makes part of the sliding frame L, L; the strip E having a groove on it which receives the tongue of the plank, and the strip K, a tongue which in like manner enters the groove of the plank, as in the original machine; the plank is thus firmly held between these tongued and grooved strips, while it is acted upon by the revolving planes. As the sliding frame which carries the grooving saws I, and that carrying the tongued strip K, require to be brought up simultaneously, and equally against the plank which is to be grooved and planed, I have devised a new and improved mode of effecting this object.

M, M, is a shaft which passes under the sliding frames J, J, and L, L, and has on it four pinions equal in size, which take into four racks, one on the under side of each of the side pieces of the two sliding frames, and by turning this shaft by means of the winch O, or otherwise, it is manifest that the two sliding frames will be simultaneously adjusted, as may be desired. This mode of adjustment as arranged and applied to my planing machine, constitutes my third claim to improvement.

In my machine as originally patented, the cutters by which the planing was effected, consisted of a number of irons, usually sixteen, affixed in slots, on the periphery of the revolving horizontal planing wheel, the edges of these cutters being carried, so as to operate like gages in turning, as described in the specification thereof. My improvement in this part consists in the employment of a smaller number of irons, usually three, of greater width, so as to extend from the periphery of the wheel, or from the ends of arms which may be substituted for a wheel, to the shaft which carries it. The forward arm or part of the wheel, forming the throat to the iron, not being extended as far out as the part forming the bed piece to the iron, allows the outer end of the iron to spall off all that is above the desired thickness to be planed off. These wide irons, which are held and adjusted by suitable screws, are shown at N, N, N, attached to three arms. These irons are not placed in the direction of radii to the wheel, but stand in relation thereto in the manner of skew irons in rabbet and other planes. They are not curved at their extremities, but have straight cutting edges; and their distinguishing characteristic is their being so set that they shall cut under the surface of the plank, without coming into contact with the fibrous surface left by the saw and the gritty matter always entangled therein. As the shaft of the planing wheel is not vertical, but has an inclination toward the plank, the edges of the irons, or cutters, will first enter that edge of the plank which is toward the shaft, cutting toward the center, and obviating all danger of spalling, and the iron will not begin cutting at the off edge until it is about returning toward the center, and, of course, it cannot produce spalling there.

I claim as my fourth improvement—

The particular mode above described of constructing and arranging the plane irons, or cutters, so that they shall cut under the surface of the stuff to be planed, they being in all respects made and arranged substantially in the manner set forth.

JAMES MacGREGOR, Jr.

Witnesses:
JOHN W. HUBBARD,
LINTON THORN.